March 19, 1968 R. A. YOHPE 3,373,695
RECIPROCATING PISTON PUMP
Filed April 28, 1966 2 Sheets-Sheet 1

INVENTOR
REINHARD A. YOHPE
BY Roy A. Plant
ATTORNEY

March 19, 1968

R. A. YOHPE 3,373,695

RECIPROCATING PISTON PUMP

Filed April 28, 1966

INVENTOR
REINHARD A. YOHPE

BY Roy A. Plant

ATTORNEY

United States Patent Office 3,373,695
Patented Mar. 19, 1968

3,373,695
RECIPROCATING PISTON PUMP
Reinhard A. Yohpe, Battle Creek, Mich., assignor to Union Pump Company, Battle Creek, Mich., a corporation of Michigan
Filed Apr. 28, 1966, Ser. No. 545,914
8 Claims. (Cl. 103—153)

ABSTRACT OF THE DISCLOSURE

This reciprocating piston pump assembly was devised to overcome certain shortcomings of prior high pressure piston pumps resulting in lowered volumetric efficiency and fractures. This is taken care of by reducing the volume of the cylinder chamber between the inlet and outlet ports, by obviating the placing of the inlet port in the side of the cylinder block, and by making the outlet port smaller, in fact smaller than the head of the outlet valve, among other things. Also by placing the inlet port and inlet valve at the end of the piston cylinder, so as to extend into the cylinder chamber to help reduce its volume, with said inlet valve assembly removable in manner permitting removing the piston through the inlet valve assembly opening, for sterilization or other treatment, after releasing the piston from the operating mechanism.

---

This invention relates broadly to liquid pumps, and more specifically to the valve positioning and construction for high pressure reciprocating liquid pumps.

As technology and necessity continually increase demands in all industrial and commercial fields, the pump industry is called upon to furnish pumping equipment for various new and old applications in numerous fields. Many times standard equipment or equipment utilizing standard principles can be readily adopted to these applications. One area which the pumping industry has been servicing is the oil producing industry, for example in operations known as secondary recovery. It has proved beneficial to inject salt water into oil wells permitting what is called "secondary recovery operations" which increases the oil productivity in the older well fields. The output pressures required in this operation are generally in the range of 2,000 to 6,000 p.s.i.

Salt water is the liquid usually used in "secondary recovery operation." Because it is very corrosive it causes pump damage generally referred to as stress-corrosive fatigue. This presents itself as cracks generally forming at intersections of bores or chambers. Stress-corrosive fatigue has been shown to occur frequently and cause greater damage as the bore or chamber size increases. Reciprocating pumps have been used in this area as a general practice with the inlet port and the outlet port being positioned substantially perpendicular to the cylinder wall and generally aligned 180° from each other. When the pumps are operated with shock conditions present, the breakdown possibilities substantially increase. Shock conditions are caused normally by starvation of liquid to the system and by air inclusion in the liquid.

The present pump structure used in the industry for high pressure reciprocating liquid pumps does permit a relatively substantial volumetric clearance of the piston. Because the inlet and outlet ports are across from each other, the bore of the inlet port is required to be larger than desirable so that assembly and manufacturing procedures can be readily accomplished. Because of this and other reasons, the piston cylinder bore is also required to be fairly large. All these features contribute to high cost and substantial maintenance expense.

One of the major methods of building a reciprocating pump capable for use in this type of corrosive liquid pumping operation is to build the pump of quite expensive anti-corrosive material, such as stainless steel, et cetera, and also substantially enlarging the cross section and dimensions of the pump. This greatly increases the size of the equipment which in turn substantially increases the cost. With the standard type of pump construction maintenance also presents a sizable problem.

Accordingly, among the objects of the present invention is the provision of a novel high pressure reciprocal pump having an inlet valve positioned in the end of the piston cylinder substantially parallel with the piston movement.

Another object is to provide a valve inlet positioned in the piston cylinder end substantially parallel to the piston, with the cylinder outlet valve in the piston connected to the piston cylinder substantially perpendicular to the piston movement.

A further object is to provide a high pressure reciprocal pump with a valve inlet and outlet system permitting easy service and maintenance of the pump including piston removal through the inlet valve end of the piston cylinder.

A still further object of the present invention is to provide a high pressure reciprocal pump with a reduced cylinder chamber and a reduced volumetric clearance to that which is presently used in the industry.

Still further objects and advantages of the invention will appear as the description proceeds.

To the accomplishment of the foregoing and related ends, the invention, then, consists of a high pressure reciprocal pump having an inlet valve positioned in the cylinder head as hereinafter fully described and particularly pointed out in the claims, the annexed drawings and the following description setting forth in detail certain means for carrying out the invention, such disclosed means illustrating, however, but several of the various ways in which the principle of the invention may be used.

Figure 1:
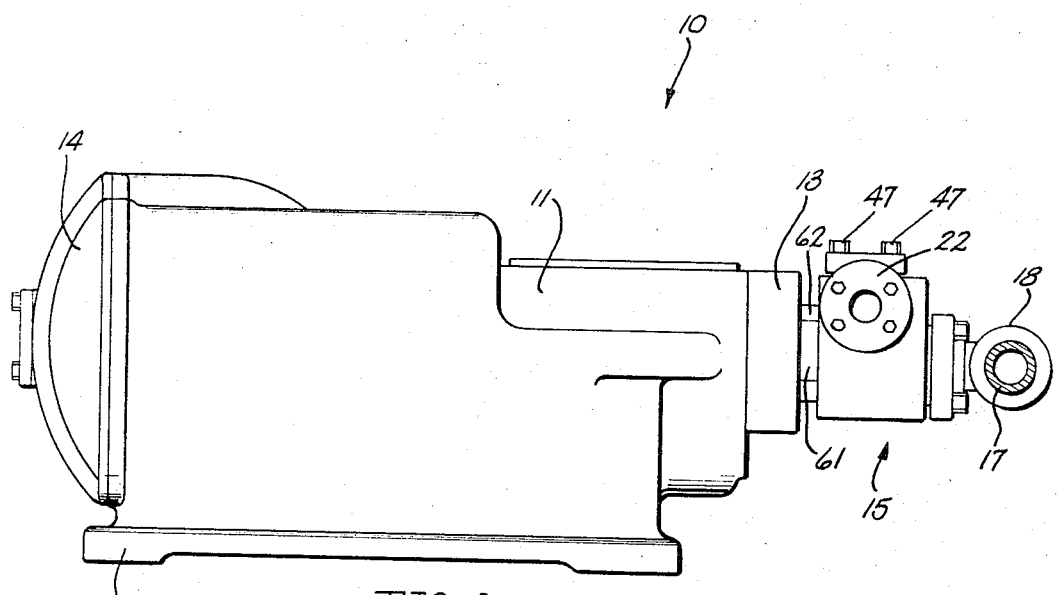
FIGURE 1 is a side elevational view illustrating a pump member having a piston cylinder structure provided with the improvement of the present invention.

Referring to FIGURE 1, numeral 10 refers generally to a pump assembly. The pump assembly 10 has a motor assembly body 11 with a base 12, a frame member 13 and an end cover 14. A cylinder assembly 15 is connected to the frame member 13 and is part of the pump assembly 10.

Figure 2:
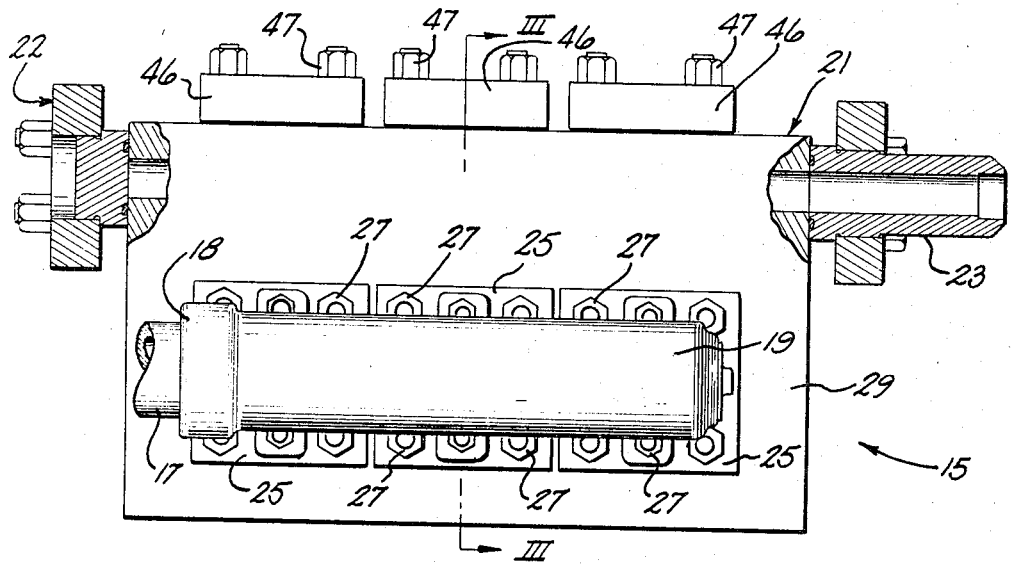
FIGURE 2 is a front elevational view of the pump unit illustrated in and seen from the right hand of FIGURE 1.

Referring generally to FIGURES 1 and 2, the cylinder assembly 15 is shown with an inlet pipe 17 connected to an inlet opening 18 of manifold 19. The liquid to be moved through the pump assembly 10 by cylinder assembly 15 will enter from inlet pipe 17 through inlet opening 18 and be distributed to the various cylinder chambers by manifold 19 as will be explained in detail below. The liquid will pass from the cylinder chamber to a discharge manifold 21. The discharge manifold 21 has a cap assembly 22 on one end and will discharge the liquid through pump assembly outlet member 23 at its opposite end.

Figures 3, 4:
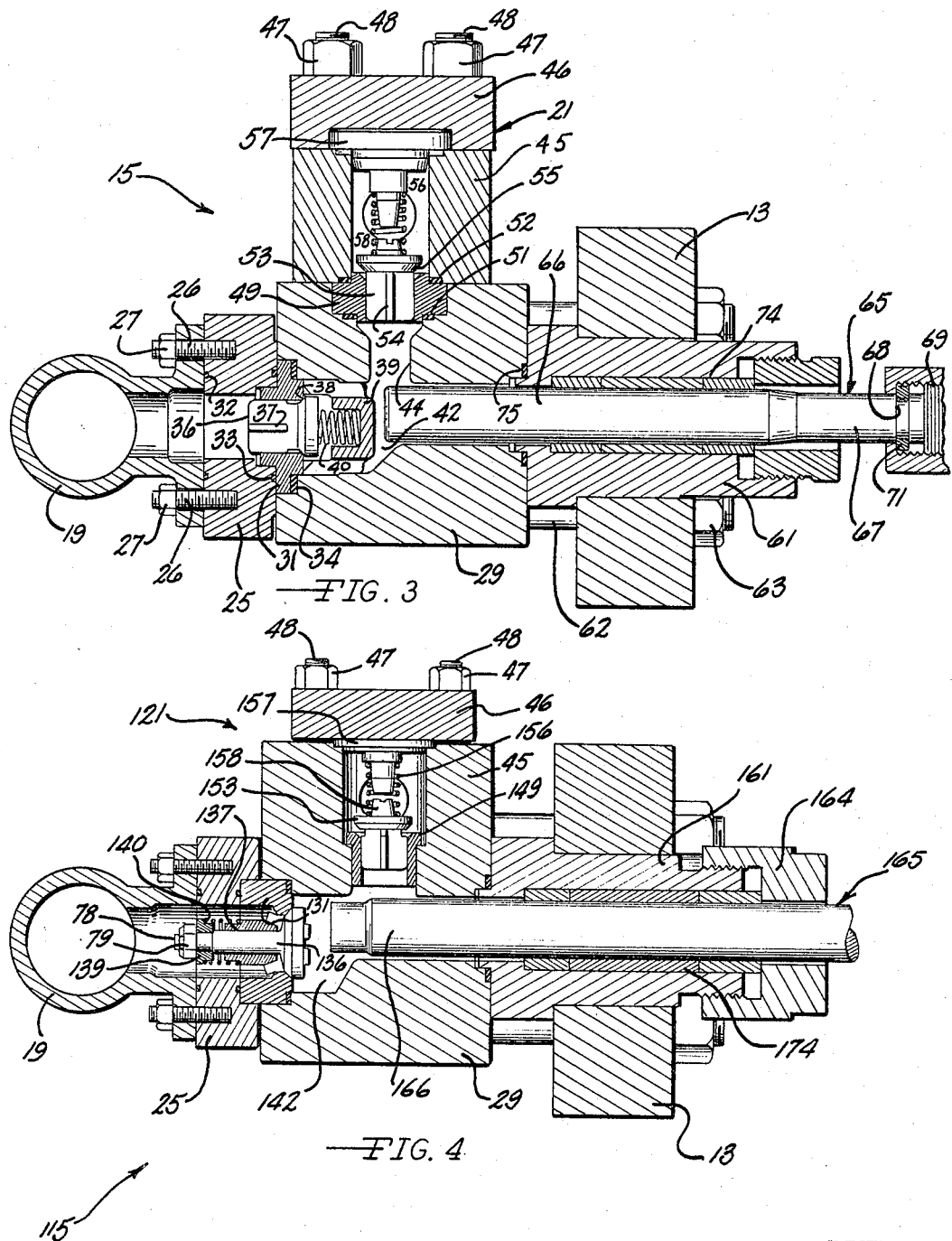
FIGURE 3 is an enlarged partial sectional view taken along line III—III of FIGURE 2, looking in the direction of the arrow.
FIGURE 4 is an alternate valve construction showing a piston and cylinder structure similar to that in the cross section shown in FIGURE 3.

Referring to FIGURE 3, the fluid will be supplied to the cylinder assembly 15 through manifold 19. The manifold 19 is connected to a cap member 25 by studs 26 and nuts 27. The cap member 25 is connected to a cylinder block 29, this can be accomplished in various manners well known in the art. A valve seat 31 is positioned between the cap member 25 and cylinder block 29. A seal 32 is provided between the manifold 19 and the cap member 25 and a seal 33 is provided between the valve seat 31 and the cap member 25. Seal 34 is provided between the valve seat 31 and cylinder block 29. These seals are used to contain the fluid in the cylinder assembly 15 and is a well practiced art.

A valve member 36 is located in its movable position by the valve seat 31. The valve member 36 has locating members 37 which act on the internal diameter of the valve seat 31 to guide the valve member 36 as it moves back and forth in the valve seat 31 between its full open and full closed positions. Valve member 36 has a seal portion 38 which makes sealing contact with the valve seat 31 at the full closed position to prevent the flow of liquid from manifold 19 during part of the pumping cycle. A stop cap 39 is located by the cylinder block 29 and is held in this locating position by the action of valve seat 31. A compression spring 40 acts on valve member 36 holding it normally in its sealed or full closed position with valve seat 31. As the fluid passes from the manifold 19 through the valve seat 31 the valve member 36 moves from its sealed position permitting the fluid to pass into cylinder chamber 42.

An outlet port 44 is provided in the side of cylinder chamber 42 and substantially at a 90° angle from the axis of valve member 36. Discharge manifold 21 is provided with a wall member 45 and a cover member 46. The cover member 46 is connected to the wall member 45 by nuts 47 acting on studs 48. A valve seat 49 is provided between the wall member 45 and cylinder block 29. Seals 51 and 52 act with valve seat 49 making sealing contact with cylinder block 29 and wall member 45, respectively. Valve member 53 is located in its movable position by valve seat 49 and it has locating members 54 which guide on the internal diameter of valve seat 49 as the valve member 53 moves back and forth in the valve seat between its full open and full closed positions. A compression spring 56 acts on a stop member 57 normally holding valve member 53 in a sealed position by having seal portion 55 in contact with valve seat 49 at its full closed position. Valve member 53 is provided with a stop member 58 which acts in conjunction with stop member 57 to limit the full open position of valve member 53. The cooperating action between the valve member 53 and valve member 36 will be explained in more detail below.

A stuffing box 61 is mounted between cylinder block 29 and frame member 13. Securing rods 62 pass through frame 13 and secure cylinder block 29 to frame 13 by the action of securing nuts 63. Piston 65 has a plunger end 66 and a securing end member 67. The securing end member 67 is provided with a slot 68. A coupling ring 71 is positioned in the slot 68 and a coupling cap 72 acts with the coupling ring 71 to secure it to a threaded end 69. The threaded end 69 is provided from the power source in motor assembly body 11 and works to supply the movement to piston 65. Stuffing box 61 is provided with stuffing box gasket 74 which makes sealing contact between the cylinder assembly 15 and the piston 65. The stuffing box gasket 74 is held in place by an externally threaded locating nut 64. Seal 75 makes sealing contact between the cylinder block 29 and the stuffing box 61.

When the threaded end 69 provides power to the piston 65, it will cause the piston 65 to move back and forth in a reciprocating movement with respect to cylinder block 29. As the piston 65 is being withdrawn away from valve member 36, the pressure of the fluid in manifold 19 will cause the valve member 36 to be removed from its sealed position permitting the liquid to move into the cylinder chamber 42. At this time the compression spring 56 will be holding valve member 53 in its sealed position. When the piston 65 has reached its maximum retracted position it will move back toward valve member 36 causing the valve member 36 to move to its sealed position in valve seat 31. At this time the pressure of the liquid in cylinder chamber 42 will cause valve member 53 to open permitting the fluid to pass into discharge manifold 21. In pump applications in the art prior to this invention, the inlet chamber or valve member 36 would have been positioned in the side of cylinder chamber 42 across from outlet port 44. This requires a larger opening to facilitate the cylinder unit's assembly, manufacture, and fluid flow around plunger end 66. The larger opening to house the side mounted inlet chamber is very susceptible to stress-corrosive fatigue as mentioned earlier. This required larger sections of cylinder block 29 and also expensive manufacturing and extra amounts of expensive material for construction. Also, in the present structure, it is possible to remove the cap member 25 permitting the removal of piston 65 out through the chamber housing the inlet valve member 36. This greatly facilitates maintenance and service activities for this type of equipment and is beneficial in reducing the work area needed to install the equipment.

Referring to FIGURE 4, a modified embodiment of the present invention is disclosed in the form of a cylinder assembly 115. The manifold 19 brings the liquid into the inlet side of the cylinder chamber 142. As the piston 165 moves away from the manifold 19 the valve member 136 opens permitting the liquid from manifold 19 to fill the cylinder chamber 142. The value member 136 has a threaded end 78 which is actuated on by a securing nut 79 which holds a stop member 139 in contact with a compression spring 140. A valve seat 131 is secured between the cap member 25 and the cylinder block 29 similar to the valve seat 31 as shown in FIGURE 3. When the plunger end 166 of piston 165 is moved away from the valve member 136 the valve member pops open from sealing contact with valve seat 131 and permits the liquid to move into the cylinder chamber 42, as explained above. When the piston plunger end 166 moves towards the valve member 136, the compression spring 140 forces the valve member back to its sealed position. Guide and locating member 137 is positioned on the valve seat 131 and guides the valve member 136 as it moves from open to closed position. When the piston end 166 is moving towards the valve member 136, the valve member 153 will open similar to valve 53 in FIGURE 3, permitting the liquid in chamber 142 to pass out through the discharge manifold 121. The valve seat 149 is mounted on and connected to wall member 45 in various manners well known in the art. The cover member 146 is secured to the wall member 45 by the studs 48 and nuts 47. A stop member 157 which is positioned adjacent to cover member 46 acts on stop member 158, which is part of valve member 153, through compression spring 156 to hold valve member 153 in a normally sealed or closed position.

Stuffing box 161 is provided and functions similar to stuffing box 61 in FIGURE 3. Stuffing box 161 is provided with a stuffing box gasket 174. The stuffing box gasket 174 is acted on by internally threaded locating nut 164 which acts on the O.D. of the stuffing box 161. The stuffing box 161 is sealed in the frame member 13 similar to stuffing box 61 of FIGURE 3. In this embodiment the cylinder chamber 162 is maintained in such a manner that the piston 165 can still be withdrawn through the manifold end of the pump assembly when repair or services are necessary for the unit.

Referring to FIGURES 3 and 4, it should be particularly pointed out that the bores housing the inlet valve assemblies 36 and 136 must be as large as or larger than the diameter of pistons 65 and 165, respectively. This is necessary to permit removal of the pistons through these bores on disassembly. When the bores which house the inlet piston assemblies are required to be larger than necessary for the pistons to pass through them, the bore will normally be eccentric to the bore in which the pistons reciprocate and the cylinder chamber. As viewed in FIGURES 3 and 4, the bores and chamber have a continuous surface at their uppermost portion. This proves quite beneficial in operation because it substantially reduces or eliminates the trapping of excess amounts of air in the cylinder chambers 42 and 142 during operation of the pump assemblies.

From the foregoing, it will be seen that a novel and advantageous utility pump has been disclosed. Attention, however, is again invited to the possibility of making variations within the spirit and scope of the invention as illustrated and described.

Other modes of applying the principle of my invention may be employed instead of those explained, change being made as regards the detailed description herein disclosed, provided the means stated by any of the following claims or the equivalent of such stated means be employed. I therefore particularly point out and distinctly claim as my invention:

1. A reciprocating piston pump assembly having, in combination,
   (a) a frame member,
   (b) a cylinder assembly mounted to said frame member,
   (c) a piston member in said cylinder assembly,
   (d) a cylinder chamber in said cylinder assembly which also has a piston cylinder,
   (e) said one end of said piston member being movable into and out of said cylinder chamber,
   (f) an inlet valve assembly positioned in said cylinder chamber and extending substantially parallel to said piston member,
   (g) said cylinder chamber being larger than said piston member,
   (h) a supply means to supply liquid to said inlet valve,
   (i) said cylinder chamber having an outlet port exiting substantially at 90° to the axis of said piston member,
   (j) an outlet means to receive said liquid from said outlet port,
   (k) said piston cylinder and said cylinder chamber being eccentric to one another and having their upper surfaces substantially continuous,
   (l) a power means connected to said piston member to move the latter in a reciprocating manner in said piston cylinder,
   (m) a means to release said power means from said piston member,
   (n) a means to remove said supply means and said inlet valve from said cylinder assembly,
   (o) means to remove said piston member through said cylinder chamber,
   (p) a valve seat for said inlet valve secured between said supply means and said cylinder chamber,
   (q) a stop cap contacting said valve seat and extending into said cylinder chamber, and
   (r) a compression spring positioned in said stop cap and tending to hold said inlet valve in a closed position with said valve seat.

2. A reciprocating piston pump assembly having, in combination,
   (a) a frame member,
   (b) a cylinder assembly mounted to said frame member,
   (c) a piston member in said cylinder assembly,
   (d) a cylinder chamber in said cylinder assembly which also has a piston cylinder,
   (e) said one end of said piston member being movable into and out of said cylinder chamber,
   (f) an inlet valve assembly positioned in said cylinder chamber and extending substantially parallel to said piston member,
   (g) said cylinder chamber being larger than said piston member,
   (h) a supply means to supply liquid to said inlet valve,
   (i) said cylinder chamber having an outlet port exiting substantially at 90° to the axis of said piston member,
   (j) an outlet means to receive said liquid from said outlet port,
   (k) said piston cylinder and said cylinder chamber being eccentric to one another and having their upper surfaces substantially continuous,
   (l) a power means connected to said piston member to move the latter in a reciprocating manner in said piston cylinder,
   (m) a means to release said power means from said piston member,
   (n) a means to remove said supply means and said inlet valve from said cylinder assembly,
   (o) means to remove said piston member through said cylinder chamber,
   (p) a valve seat for said inlet valve secured between said supply means and said cylinder chamber,
   (q) an end member on said inlet valve member extending toward said supply means,
   (r) a stop member mounted to said inlet valve end member,
   (s) a guide and locating member mounted on said valve member, and
   (t) a compression spring acting between said stop member and said guide and locating member tending to hold said inlet valve in a closed position on said valve seat.

3. A reciprocating piston pump assembly having in combination
   (a) a frame member,
   (b) a cylinder assembly mounted on said frame member,
   (c) said cylinder assembly having a cylinder block,
   (d) said cylinder block being bored to form at least one piston cylinder,
   (e) a piston member in said piston cylinder bore,
   (f) a cylinder chamber at the inlet end of said cylinder bore,
   (g) an inlet valve assembly extending into said cylinder chamber,
   (h) said inlet valve assembly having an inlet valve operable in a direction substantially parallel to that of said piston with said valve assembly largely filling said cylinder chamber,
   (i) a valve seat member having an inner portion on which said inlet valve will seat and seal when in closed position,
   (j) a compression spring holding said inlet valve normally in seated position within said cylinder chamber,
   (k) a supply means to supply liquid to said inlet valve assembly and through same into said cylinder chamber,
   (l) said cylinder block having an outlet port exiting from said cylinder chamber substantially at 90° to the axis of said piston cylinder carrying said piston member,
   (m) an outlet valve assembly communicating with said outlet port,
   (n) an outlet valve in said outlet assembly with the head of said outlet valve being larger than said outlet port,
   (o) said outlet valve assembly having a valve seat member having an inner portion on which the head of said outlet valve will seat and seal when in closed position,
   (p) a compression spring holding said outlet valve normally in seated position, and
   (q) an outlet means to receive liquid from said outlet port, whereby said cylinder chamber will be largely filled with said inlet valve assembly, the inlet valve chamber and the cylinder chamber substantially continuous, and the outlet port small, thus reducing the concentrated stress points and improving operating efficiency by reducing the volume of said cylinder chamber when the piston is at the end of its pumping stroke.

4. A reciprocating piston pump assembly as set forth in claim 3, wherein
   (a) said inlet valve assembly includes a stop cap having open sides, said stop cap contacting said valve seat member around the valve seat of same and extending into said cylinder chamber, and
   (b) a compression spring positioned within said stop cap and in engagement with the end of same and said valve to normally hold the latter in sealing engagement with said valve seat while permitting said valve to open and close.

5. A reciprocating piston pump assembly according to claim 1, having
   (a) at least two cylinder assemblies mounted together on said frame member,
   (b) an inlet manifold connecting said supply means,
   (c) an outlet manifold connecting said outlet means, and
   (d) means to reciprocate said pistons in a timed relationship.

6. A reciprocating piston pump assembly according to claim 5, having
   (a) said outlet port expanding at one end away from said cylinder chamber to receive an outlet valve assembly.

7. A reciprocating piston pump assembly according to claim 6, having
   (a) said outlet port expanding at one end away from said cylinder chamber to receive an outlet valve assembly.

8. A reciprocating piston pump assembly according to claim 7, having
   (a) at least two cylinder assemblies mounted together on said frame member,
   (b) an inlet manifold connecting said supply means,
   (c) an outlet manifold connecting said outlet means, and
   (d) means to reciprocate said pistons in a timed relationship.

References Cited

UNITED STATES PATENTS

| | | | |
|---|---|---|---|
| 1,328,474 | 1/1920 | Astrom | 103—153 |
| 1,384,097 | 7/1921 | Schlacks | 103—153 |
| 1,556,149 | 10/1925 | Koppelman | 103—153 |
| 2,145,854 | 2/1939 | Bijur. | |
| 2,168,850 | 8/1939 | Towler et al. | |
| 2,503,478 | 4/1950 | Grime | 103—153 |
| 2,796,026 | 6/1957 | Hooker. | |
| 3,016,717 | 1/1962 | Gottzman. | |
| 3,019,739 | 2/1962 | Prosser. | |
| 3,128,941 | 4/1964 | Waibel. | |
| 3,135,219 | 6/1964 | Hays et al. | |
| 3,220,202 | 11/1965 | Gottzman | 103—153 |

HENRY F. RADUAZO, *Primary Examiner.*